United States Patent
Malik

(10) Patent No.: US 7,876,737 B2
(45) Date of Patent: Jan. 25, 2011

(54) METHODS AND APPARATUS FOR LOCATIONING BASED NAT ACCESS IN WIRELESS NETWORKS

(75) Inventor: Ajay Malik, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 830 days.

(21) Appl. No.: 11/831,432

(22) Filed: Jul. 31, 2007

(65) Prior Publication Data

US 2009/0034493 A1  Feb. 5, 2009

(51) Int. Cl.
*H04W 4/00* (2009.01)
(52) U.S. Cl. .................. 370/338; 709/245
(58) Field of Classification Search .............. 370/338; 709/242–245
See application file for complete search history.

(56) References Cited

U.S. PATENT DOCUMENTS 7,739,402 B2 * 6/2010 Roese et al. ............ 709/242

2004/0139228 A1 * 7/2004 Takeda et al. ............ 709/245

* cited by examiner

Primary Examiner—Albert T Chou

(57) ABSTRACT

Methods and systems are provided for location-based network address translation (NAT). The system allows an administrator to logically partition an environment into a plurality of spatial regions. The method then includes specifying, for each of the spatial regions, whether network address translation (NAT) is allowed or not allowed for that spatial region, then performing a locationing procedure to determine in which spatial region the mobile unit is located. NAT is allowed for wireless data communication from the mobile unit if the mobile unit is within one of the spatial regions for which NAT is allowed, and is not allowed for wireless data communication from the mobile unit if the mobile unit is within one of the spatial regions for which NAT is not allowed. The systems and methods are applicable, for example, to networks operating in accordance with 802.11, RFID, WiMax, WAN, Bluetooth, Zigbee, UWB, and the like.

13 Claims, 2 Drawing Sheets

METHODS AND APPARATUS FOR LOCATIONING BASED NAT ACCESS IN WIRELESS NETWORKS

TECHNICAL FIELD

The present invention relates to wireless local area networks (WLANs) and other networks incorporating RF elements and/or RF devices. More particularly, the present invention relates to improved network address translation (NAT) in wireless networks.

BACKGROUND

Network Address Translation (NAT) is a process conventionally used in wired and wireless networks to reconfigure the source and/or destination address of IP packets as they pass through a router, switch, firewall, or other network component. NAT is often used to allow multiple hosts in a private network to access other networks (e.g., the Internet), using a single public IP address (e.g., in connection with a gateway).

There has been a dramatic increase in demand for mobile connectivity solutions utilizing various wireless components and WLANs. Such networks generally involve the use of wireless access points (APs) configured to communicate with mobile devices using one or more RF channels in accordance with various wireless standards and protocols. Such systems increasingly utilize NAT for network communications.

In the context of wireless networks, NAT may be unsatisfactory in a number of respects. For example, NAT can be considered an administratively-opened hole in the network, and may be exploited by a user with malicious intent. In the context of wireless communications, many different types of wireless devices operated by many different users may be able to associate with access ports within a given network, increasing the security risk.

Accordingly, there is a need for improved methods and systems for implementing NAT in wireless network devices.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The present invention relates to systems and methods for improved network access translation (NAT) in a wireless network using on-board locationing within a network switch. In this regard, the following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission and data formatting protocols and that the system described herein is merely one example embodiment of the invention.

For the sake of brevity, conventional techniques related to signal processing, data transmission, signaling, network control, the 802.11 family of specifications, wireless networks, RFID systems and specifications, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example," rather than "model." Although the figures may depict example arrangements of elements, additional intervening elements, devices, features, or components may be present in an embodiment of the invention.

Figure 1:
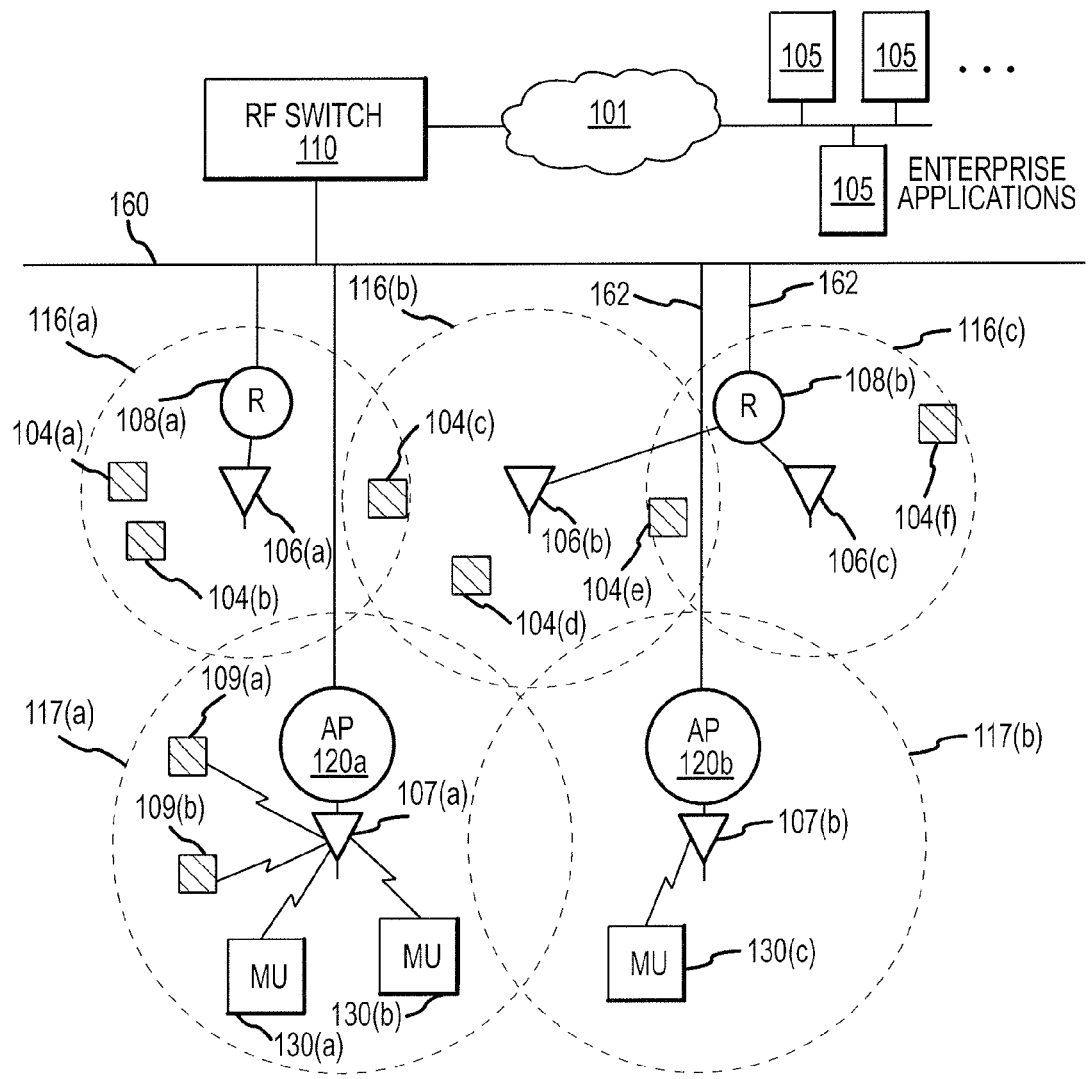
FIG. 1 is a conceptual overview of a wireless network useful in describing various embodiments.

Referring to FIG. 1, in an example system useful in describing the present invention, a switching device 110 (alternatively referred to as an "RF switch," "WS," or simply "switch") is coupled to a network 101 and 160 (e.g., an Ethernet network coupled to one or more other networks or devices) which communicates with one or more enterprise applications 105. One or more wireless access ports 120 (alternatively referred to as "access ports" or "APs") are configured to wirelessly connect to one or more mobile units 130 (or "MUs"). APs 120 suitably communicate with switch 110 via appropriate communication lines 162 (e.g., conventional Ethernet lines, or the like). Any number of additional and/or intervening switches, routers, servers and other network components may also be present in the system.

A number of RF tags ("RFID tags," or simply "tags") 104, 107 may also be distributed throughout the environment. These tags, which may be of various types, are read by a number of RFID readers (or simply "readers") 108 having one or more associated antennas 106 provided within the environment. The term "RFID" is not meant to limit the invention to any particular type of tag. The term "tag" refers, in general, to any RF element that can be communicated with and has an ID (or "ID signal") that can be read by another component. Readers 108, each of which may be stationary or mobile, are suitably connective via wired or wireless data links to a RF switch 110.

A particular AP 120 may have a number of associated MUs 130. For example, in the illustrated topology, MUs 130(a) and

130(*b*) are associated with AP 120(*a*), while MU 130(*c*) is associated with AP 120(*b*). One or more APs 120 may be coupled to a single switch 110, as illustrated.

RF Switch 110 determines the destination of packets it receives over network 104 and 101 and routes those packets to the appropriate AP 120 if the destination is an MU 130 with which the AP is associated. Each WS 110 therefore maintains a routing list of MUs 130 and their associated APs 120. These lists are generated using a suitable packet handling process as is known in the art. Thus, each AP 120 acts primarily as a conduit, sending/receiving RF transmissions via MUs 130, and sending/receiving packets via a network protocol with WS 110.

RF switch 110 can support any number of tags that use wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

A particular RFID reader 108 may have multiple associated antennas 106. For example, as shown in FIG. 1, reader 108(*a*) is coupled to one antenna 106(*a*), and reader 108(*b*) is coupled to two antennas 106(*b*) and 106(*c*). Reader 108 may incorporate additional functionality, such as filtering, cyclic-redundancy checks (CRC), and tag writing, as is known in the art.

Each antenna 106, 107 has an associated RF range 116, 117 106 (or "signal strength contour") which depends upon, among other things, the strength of the respective antenna, and may be defined by a variety of shapes, depending upon the nature of the antenna (i.e., the RF range need not be circular or spherical as illustrated in FIG. 1). An antenna 107 coupled to an AP 120 may also communicate directly with RFID tags (such as tags 109(*a*) and 109(*b*), as illustrated). It is not uncommon for RF ranges to overlap in real-world applications (e.g., doorways, small rooms, etc.). Thus, as shown in FIG. 1, read point 116(*a*) overlaps with read point 116(*b*), which itself overlaps with read point 116(*c*), and range 117(*a*) overlaps with range 117(*b*).

As described in further detail below, switch 102 includes hardware, software, and/or firmware capable of carrying out the functions described herein. Thus, switch 102 may comprise one or more processors accompanied by storage units, displays, input/output devices, an operating system, database management software, networking software, and the like. Such systems are well known in the art, and need not be described in detail. Switch 102 may be configured as a general purpose computer, a network switch, or any other such network host. In a preferred embodiment, controller or switch 102 is modeled on a network switch architecture but includes RF network controller software (or "module") whose capabilities include, among other things, the ability to allow configure and monitor readers 108 and antennas 106.

Figure 2:
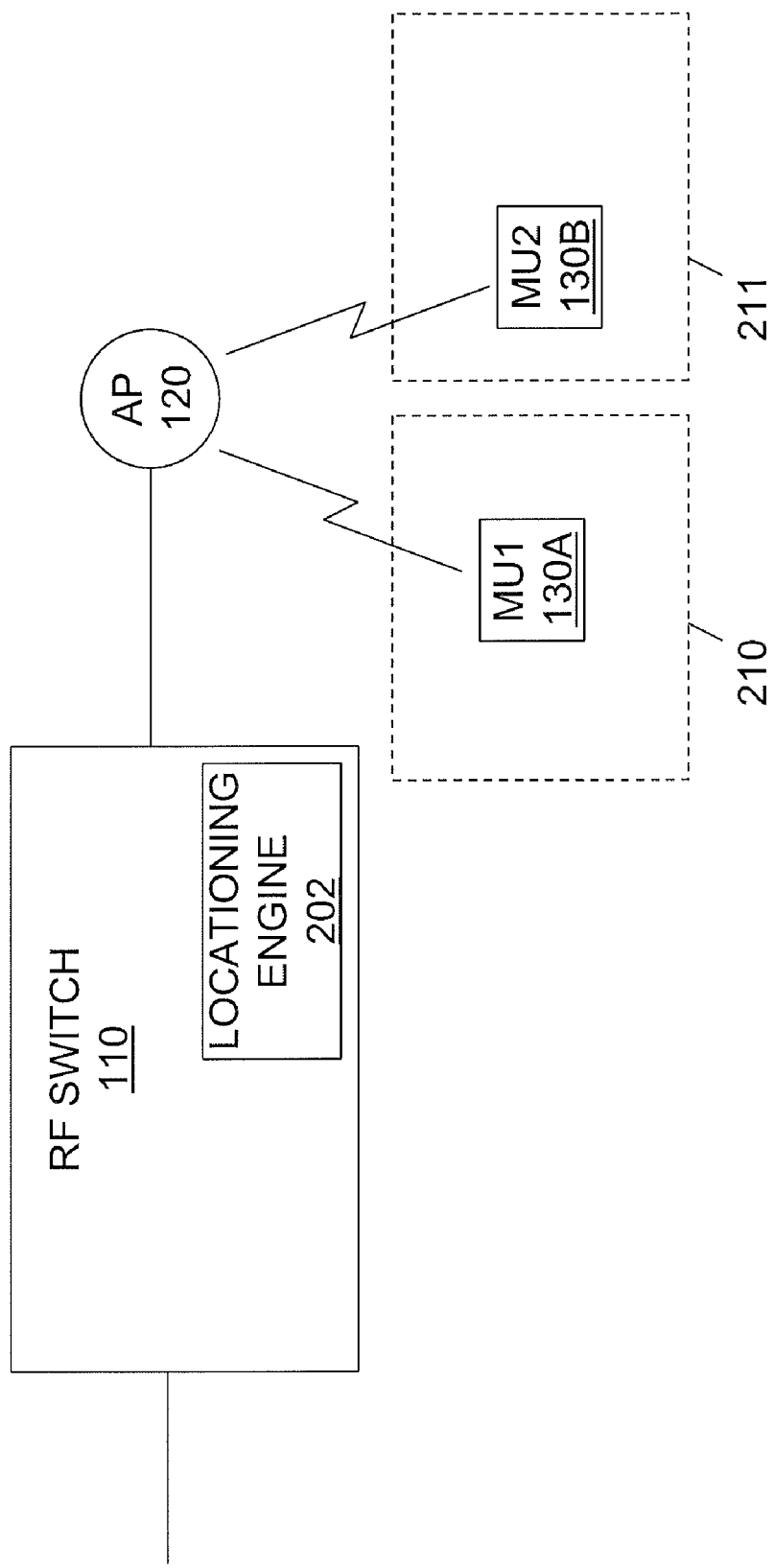
FIG. 2 is a conceptual diagram of multiple mobile units associated with an access port and communicating with a wireless switch in accordance with one embodiment.

Referring to FIG. 2, RF switch 110 generally includes a locationing engine 202, as well as a variety of other components—e.g., a cell controller (CC) and an RFID network controller (RNC) (not shown). The RNC includes hardware and software configured to handle RFID data communication and administration of the RFID network components, while the CC includes hardware and software configured to handle wireless data (e.g., in accordance with IEEE 802.11) from the mobile units and access ports within wireless cells. In one embodiment, RF switch 110 includes a single unit with an enclosure containing the various hardware and software components necessary to perform the various functions of the CC and RNC as well as suitable input/output hardware interfaces to networks 101 and 160. Thus, locationing engine 202 may be referred to as an "on-board" locationing engine in that it is generally enclosed within or otherwise integral with RF switch 110.

RF switch is capable of implementing network address translation (NAT) of any type now known or later developed. Such NAT types include, for example, full-cone NAT, restricted-cone NAT, port-restricted NAT, and symmetrical NAT.

RF switch 110 is coupled to an AP 120, as previously described, which in turn is associated with and communicates with one or more MUs 130. Each AP 120 has an associated RF coverage area or signal strength contour, which corresponds to the effective range of its antenna or RF transmitter. These coverage areas may have any arbitrary shape or size, depending upon factors known in the art. For example, these coverage areas may be determined through a receiver signal strength indicator (RSSI) calculation, as is known in the art. APs 120 may comprise one or more processors accompanied by storage units, displays, input/output devices, an operating system, database management software, networking software, and the like. Such systems are well known in the art, and need not be described in detail here.

For wireless data transport, AP 120 may support one or more wireless data communication protocols—e.g., RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; GPRS; and proprietary wireless data communication protocols such as variants of Wireless USB.

In this illustration, there are two MUs: MU1 (130A), and MU2 (130B). MU1 is located within a one spatial region 210, and MU2 is located within another spatial region 211. Regions 210 and 211 may correspond to different rooms, floors, buildings, and the like, and have locations and characteristics known by locationing engine 202 a priori. The environment (and regions 210, 211) may correspond to physical spaces within a workplace, a retail store, a home, a warehouse, or any other such site, and will typically include various physical features that affect the nature and/or strength of RF signals received and/or sent by the APs. Such feature include, for example, architectural structures such as doors, windows, partitions, walls, ceilings, floors, machinery, lighting fixtures, and the like, and are preferably known by locationing engine 202. Note that the present invention is not limited to two-dimensional layouts; it may be implemented within three dimensional spaces as well.

In accordance with the present invention, RF switch 110 is configured to allow NAT operation for MUs in some regions (i.e., logical regions), and prevent NAT operation of other regions. As a preliminary matter, then, locationing engine 202 is configured to determine, with suitable accuracy, the location of MUs 130 within the environment. Thus locationing engine 202 will know that MU1 is within region 210, while MU2 is within region 211. This locationing may be performed in any convenient manner, including the use of triangulation based on signal strength (RSSI method, known in the art), the use of "near-me" RFID tags, or the like. In the triangulation method, for example, the signal strength of MU 130 corresponding to each AP is known a priori as the result of a suitable reporting mechanism, and this data can be used to map each MU 130 in space.

RF switch 110 includes a suitable memory, accessible and configurable by an administrator, that designates which regions may use NAT, and which regions may not. For example, referring to FIG. 3, RF switch 110 may be configured such that region 210 is allowed NAT, and region 211 is not. When RF switch 110 receives a request from MU1 or MU2, it first accesses the location of that MU, as determined by locationing engine 202. It then determines whether that MU is within a region that allows or does not allow NAT, and handles the request accordingly. In this way, NAT may remain open for some wireless clients within certain parts of a building, campus, or the like, and not be available for wireless clients in other parts of the site. In this way, security can be improved for the network in general.

While an 802.11-type environment is described above, the methods described apply to any locationing prediction that uses RSSI as a driving decision for computation, for example, RFID, WiMax, WAN, Bluetooth, Zigbee, UWB, and the like.

The methods described above may be performed in hardware, software, or a combination thereof. For example, in one embodiment one or more software modules are configured as a "locationing module" executed on a general purpose computer having a processor, memory, I/O, display, and the like. This computer module may be included with an AP 120, an MU 130, an enterprise application 105, or RF switch 110

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A method for data communication in a wireless network, comprising:
   logically partitioning an environment into a plurality of spatial regions;
   specifying, for each of the spatial regions, whether network address translation (NAT) is allowed or not allowed for that spatial region;
   receiving a wireless data communication from a mobile unit;
   performing a locationing procedure to determine in which spatial region the mobile unit is located; and
   allowing NAT for the wireless data communication from the mobile unit if the mobile unit is within one of the spatial regions for which NAT is allowed, and not allowing NAT for the wireless data communication from the mobile unit if the mobile unit is within one of the spatial regions for which NAT is not allowed.

2. The method of claim 1, wherein the step of performing a locationing procedure includes utilizing the signal strength of the mobile unit.

3. The method of claim 2, wherein utilizing the signal strength includes utilizing a (receiver signal strength indicator) RSSI.

4. The method of claim 1, wherein the mobile unit is configured to operate within a wireless environment selected from the group consisting of 802.11, RFID, WiMax, WAN, Bluetooth, Zigbee, and UWB.

5. The method of claim 1, wherein the locationing procedure accesses stored information regarding geographical details associated with the environment.

6. A wireless network system comprising:
   a mobile unit;
   an access port configured to wirelessly communicate with the mobile unit;
   a wireless switch coupled to the access port, the wireless switch including an on-board locationing engine configured to determine the location of the mobile unit in an environment, wherein the wireless switch is further configured to:
   allow a user to logically partition the environment into a plurality of spatial regions and specify, for each of the spatial regions, whether network address translation (NAT) is allowed or not allowed for that spatial region; and
   allow NAT for wireless data communication from the mobile unit if the location of the mobile unit is within one of the spatial regions for which NAT is allowed, and not allow NAT for wireless data communication from the mobile unit if the location of the mobile unit is within one of the spatial regions for which NAT is not allowed.

7. The system of claim 6, wherein the access port is configured to operate within a wireless environment selected from the group consisting of 802.11, RFID, WiMax, WAN, Bluetooth, Zigbee, and UWB.

8. The system of claim 6, wherein locationing engine utilizes a set of signal strength values based on a receiver signal strength indicator (RSSI).

9. The system of claim 6, wherein the locationing engine includes stored information regarding geographical details associated with the environment.

10. A network switching device comprising an on-board locationing engine configured to determine the location of a mobile unit in an environment, and is further configured to allow NAT for wireless data communication from the mobile unit if the location of the mobile unit is within a spatial regions for which NAT has been allowed, and not allow NAT for wireless data communication from the mobile unit if the location of the mobile unit is within a spatial regions for which NAT has not been allowed.

11. The device of claim 10, wherein the mobile unit is configured to operate within a wireless environment selected from the group consisting of 802.11, RFID, WiMax, WAN, Bluetooth, Zigbee, and UWB.

12. The device of claim 10, wherein the on-board locationing engine utilizes a set of signal strength values based on a receiver signal strength indicator (RSSI).

13. The device of claim 10, wherein the on-board locationing engine utilizes stored information regarding geographical details associated with the environment.

* * * * *